United States Patent [19]
Hohla et al.

[11] 4,068,196
[45] Jan. 10, 1978

[54] IODINE GAS LASER DEVICE

[75] Inventors: Kristian Hohla, Garching; Werner Fuss, Munich, both of Germany

[73] Assignee: Max-Planck-Gesellschaft zur Forderung der Wissenschaften e.V., Gottingen, Germany

[21] Appl. No.: 707,929

[22] Filed: July 22, 1976

[30] Foreign Application Priority Data

July 31, 1975 Germany ............... 2534322

[51] Int. Cl.$^2$ ............................................. H01S 3/00
[52] U.S. Cl. ...................... 331/94.5 G; 331/94.5 P; 331/94.5 D
[58] Field of Search ............ 331/94.5 G, 94.5 P, 331/94.5 PE, 94.5 D

[56] References Cited
U.S. PATENT DOCUMENTS

| | | | |
|---|---|---|---|
| 3,842,364 | 10/1974 | Srinivason | 331/94.5 |
| 3,876,959 | 4/1975 | Biancardi | 331/94.5 G |
| 3,882,414 | 5/1975 | Jeffers | 331/94.5 G |
| 3,886,477 | 5/1975 | Ruby | 331/94.5 G |
| 3,982,200 | 9/1976 | Hoag | 331/94.5 P |

OTHER PUBLICATIONS

Hohla et al., *Applied Physics Lett.*, vol. 18, No. 2, Jan. 15, 1971, pp. 48–49.
Silvast et al., *Appl. Phys. Letters*, vol. 25, No. 10, Nov. 15, 1974, pp. 593–595.
Gusinow et al., *Journ. of Appl. Phys.*, vol. 6, No. 2, Feb. 1975, pp. 796–801.

*Primary Examiner*—Martin H. Edlow
*Attorney, Agent, or Firm*—Sughrue, Rothwell, Mion, Zinn and Macpeak

[57] ABSTRACT

A gas containing an active iodine compound is circulated through a laser tube, a purifying device and a gas reconstitution device. The active compound is consumed by lasing in the laser tube, waste products of the lasing action are removed by the purifying device and the gas reconstitution device maintains the concentration of the active compound at an operational level.

11 Claims, 3 Drawing Figures

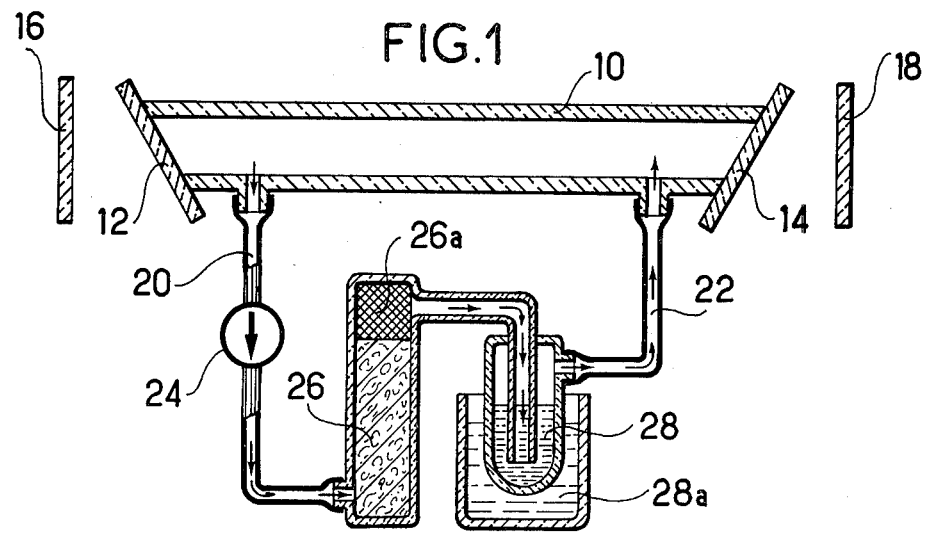
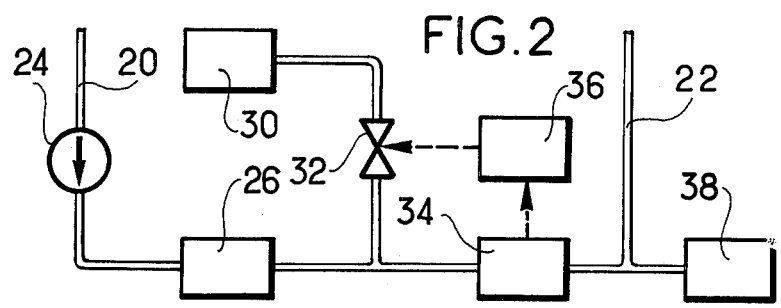
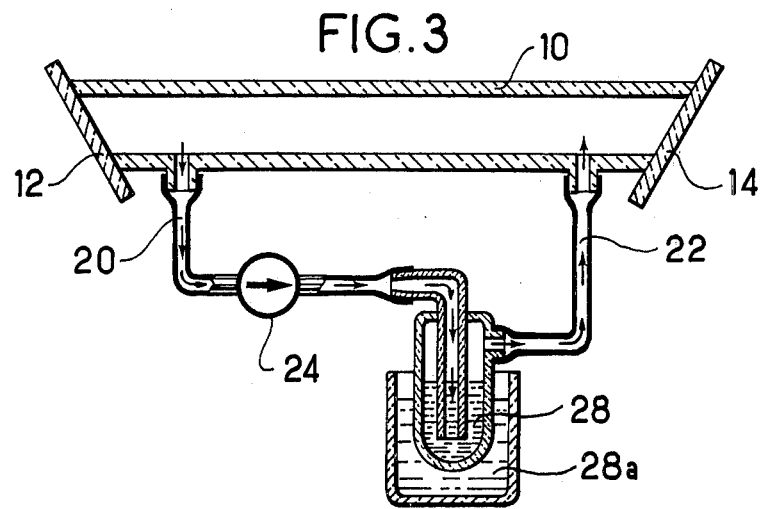

IODINE GAS LASER DEVICE

BACKGROUND OF THE INVENTION

1. Field of the Invention

The present invention relates to an iodine laser. Such a laser comprises a tubular receptacle containing a gaseous laser medium containing an iodine compound which can be stimulated for laser emission and a device capable of producing a population inversion in the laser medium.

2. Description of the Prior Art

In an iodine laser, the active part of the gaseous laser medium is generally constituted by an organic iodine compound which can be photolytically decomposed by a flash tube.

When a laser pulse is emitted, only a part of the organic iodine compound contained in its tube is decomposed by photolysis to form molecular iodine and an inactive gas. When the tube containing the unused organic iodine compound is subsequently illuminated, this molecular iodine reduces the efficiency of laser emission since iodine atoms in the fundamental state are formed by various reactions. To avoid this reduction in efficiency, it has been necessary up till now to replace the gas in the laser tube after each firing. This operation is both long and expensive, for the unused iodine compound must either be discarded or else recuperated. Preferred embodiments of the present invention is to improve the use of the stimulable iodine compound in a laser diode.

SUMMARY OF THE INVENTION

The present invention provides an iodine laser comprising a tubular receptacle containing a gaseous laser medium containing an iodine compound, and a device capable of effecting a population reversal in the laser medium, the said receptacle being placed in the circuit of gas circulation means comprising:

a purifying device for removing the elementary iodine which forms in the receptacle during the operation of the laser;
a reconstituting device for replacing the consumed iodine compound; and
a device for circulating of the laser medium.

Preferred embodiments of the present invention make it possible not only to save the iodine compound appreciably, but also to increase the working speed, i.e. to increase the firing rate of the laser.

Embodiments of the invention are described hereinbelow by way of example with reference to the accompanying drawing.

BRIEF DESCRIPTION OF THE DRAWINGS

FIG. 1 is a schematic side view, in partial cross-section, of a first embodiment of the invention;

FIG. 2 is a block diagram of a part of a second embodiment of the invention; and FIG. 3 is a schematic side view, in partial cross-section, of a third embodiment of the invention.

DESCRIPTION OF THE PREFERRED EMBODIMENTS

A laser diode according to the present invention may be constituted by a laser tube of a type currently available in which a population inversion and a stimulated emission of laser radiation are produced in a known way. This tube is placed in a gas circulating device comprising a circulating pump, a purifying device and a gas reconstitution device. The gas contained in the laser tube is removed by the pump and conveyed to the purifying and filling devices. The gas is then purified, its iodine compound content is reestablished and the reconstituted gas is directed again towards the laser tube.

The laser shown in FIG. 1 is an embodiment of the invention. This laser comprises a laser tube 10 of a type currently available, made e.g. of glass or quartz. The ends of the tube 10 are closed by windows 12 and 14 at the Brewster angle. The laser tube is placed between a totally reflecting mirror 16 and a partly transparent mirror 18. This tube can be disposed in a conventional way on the focal axis of a cylindrical mirror having an elliptical base, (not shown), a flash tube, (also not shown), being placed on the other focal axis of this mirror. The light radiated by the flash tube makes it possible to effect photolysis of the iodine compound and consequently to effect a population inversion.

The laser tube 10 is provided, in the vicinity of its ends, with connection tubes 20 and 22. The connection tube 20 is connected to a circulation pump 24 which sucks in the gaseous contents of the laser tube 10 and compresses it and directs it to a purifying device 26. On leaving the purifying device 26, the laser gas passes through a device 28 which enables the active gaseous medium used to be regenerated. This gas then passes through the pipe 22 to be brought again into the laser tube 10.

The purification of the gaseous mixture coming from the laser tube 10 can be effected by removal of the iodine by a physical or chemical process. The chemical removal of the iodine can be effected by reducing agents such as $Na_2S_2O_3$, mercury, silver, copper or copper amalgam, etc. Impurities in the form of dust are then removed by dust filters or by a low-pressure suction system. The formation of these dust impurities can alternatively be avoided by the use of a pasty substance containing a reducing agent in solution in a liquid solvent having a high boiling point (e.g. triethylene glycol).

The iodine which forms in the laser tube 10 during the operation of the laser can be removed by a physical process, for example by absorption by active carbon, while the dust is removed or suppressed as in chemical purifying, or by passing through a cold trap whose temperature is kept below $+10°$ C.

The purifying device 26 can, for example, be made of a column filled with copper amalgam turnings and provided at its outlet with a dust filter 26a.

The device 28 for reconstituting the active laser medium can, as shown in FIG. 1, comprise a bath system containing the iodine compound in liquid form, the temperature of this compound being maintained by means of a cooling bath 28a at a temperature such that the vapour pressure of the iodine compound corresponds to the required partial pressure of the iodine compound in the active medium.

In the embodiment shown in FIG. 2, the gas circulating device comprises a circulating pump 24 and a purifying device 26 which can be constituted as described hereinabove.

The reconstitution of the active laser gases is effected by addition of a gaseous iodine compound from a tank 30 controlled by a regulating valve 32. The partial pressure of the iodine compound is controlled by means of a cell 34 which measures the absorption of ultra-violet radiation by this iodine compound. The regulating valve 32 can be operated manually or automatically by a conventionally built regulator 36, as a function of the data provided by the absorption cell 34.

The gas circulating device can comprise a pressure limiting valve or an expansion tank as shown at 38.

FIG. 3 is a particularly simple embodiment of the invention: the purifying and reconstituting devices are combined so that the bath device 28 used as a tank for cooling the iodine compound is also used as a cold trap for removing the iodine.

In a currently used gas laser installation where the gas of the tube is renewed after each firing, about 130 grams of iodine compound are consumed for emitting 200 laser pulses. By using a gas circulating device of the type shown in FIG. 3, the iodine compound consumption has been reduced for this laser to about 8 grams, all the other conditions being unchanged.

The active laser mediums can be those used currently in iodine lasers, e.g. $C_3F_7I$.

What we claim is:

1. An iodine laser comprising a tubular receptacle containing a gaseous laser medium containing an iodine compound, and a device capable of effecting a population reversal in the laser medium and a gas circulation circuit means for said receptacle, said receptacle being placed in said circuit means and wherein said gas circulation circuit means comprises:

a purifying device for removing the elementary iodine which forms in said receptacle during the operation of the laser;

a reconstituting device for replacing the consumed iodine compound; and a device for circulating of the laser medium through said circuit means including said tubular receptacle.

2. An iodine laser according to claim 1, wherein the purifying device comprises a substance suitable for fixing the iodine by a physical process.

3. An iodine laser according to claim 2, wherein the said substance for fixing the iodine is active carbon.

4. An iodine laser according to claim 1, wherein the purifying device comprises a substance suitable for fixing the iodine by chemical process.

5. An iodine laser according to claim 4, wherein the said substance suitable for fixing the iodine by chemical process is chosen from the group constituted by sodium thiosulphate, mercury, silver, copper and copper amalgam.

6. An iodine laser according to claim 1, wherein the purifying device contains a cold trap.

7. An iodine laser according to claim 1, wherein the purifying device further comprises means for removing dust.

8. An iodine laser according to claim 1, wherein the device for reconstituting the iodine compound comprises a tank whose temperature is maintained by means of a temperature stabilizing device at a level such that the vapour pressure of the iodine compound corresponds to the partial pressure of this iodine compound required in said receptacle.

9. An iodine laser according to claim 6, wherein the said cold trap is capable of simultaneously fixing the iodine and of re-establishing the concentration of the iodine compound in the laser gas.

10. An iodine laser according to claim 1, wherein a tank containing an iodine compound is connected to the gas circulating device by a regulating valve.

11. An iodine laser according to claim 10, further including a device for measuring the concentration of the iodine compound downstream of the regulating valve, said regulating valve being controlled by said device for measuring the concentration of the iodine compound.

* * * * *